United States Patent
Moriyama (10) Patent No.: US 9,964,356 B2
(45) Date of Patent: May 8, 2018

(54) DRIER APPARATUS

(71) Applicant: KENKI CO., LTD., Fukuoka (JP)

(72) Inventor: Hideyuki Moriyama, Fukuoka (JP)

(73) Assignee: KENKI CO., LTD., Fukuoka (JP)

(*) Notice: Subject to any disclaimer, the term of this patent is extended or adjusted under 35 U.S.C. 154(b) by 0 days. days.

(21) Appl. No.: 15/336,433

(22) Filed: Oct. 27, 2016

(65) Prior Publication Data

US 2017/0045292 A1 Feb. 16, 2017

Related U.S. Application Data

(63) Continuation of application No. PCT/JP2016/064452, filed on May 16, 2016.

(30) Foreign Application Priority Data

Jun. 5, 2015 (JP) .................................. 2015-114998

(51) Int. Cl.
  *F26B 17/20* (2006.01)
  *F26B 1/00* (2006.01)
  (Continued)

(52) U.S. Cl.
  CPC .............. *F26B 1/005* (2013.01); *B65G 33/18* (2013.01); *B65G 33/30* (2013.01); *C02F 11/12* (2013.01);
  (Continued)

(58) Field of Classification Search
  CPC .......... F26B 1/005; F26B 17/20; F26B 23/00; F26B 2200/04; F26B 2200/24; B65G 33/18; B65G 33/30; C02F 11/12
  (Continued)

(56) References Cited

U.S. PATENT DOCUMENTS 2,693,873 A * 11/1954 Martin ................... B65G 33/00
  198/657
3,233,335 A * 2/1966 Neitzel .................... D06C 7/00
  34/528

(Continued)

FOREIGN PATENT DOCUMENTS

FR  3000731 A1 * 7/2014 ............. B65G 33/18
JP  S61-273432 A  12/1986
(Continued)

OTHER PUBLICATIONS

International Search Report issued in PCT/JP2016/064452, dated Aug. 9, 2016 (3 pages).

(Continued)

*Primary Examiner* — Stephen M Gravini
(74) *Attorney, Agent, or Firm* — Nakanishi IP Associates, LLC (57) ABSTRACT

A drier apparatus includes a cylindrical chamber in which a pair of screw conveyers each including a tubular shaft in which heat medium is able to flow, and carrier blades arranged on an outer surface of the tubular shaft is housed, a motor for rotating the screw conveyers, an input path connected to the cylindrical chamber at a proximal end of each of the screw conveyers, and an output path connected to the cylindrical chamber at a distal end of each of the screw conveyers. The input path and the output path include a device for opening and closing a path. Each of the screw conveyers includes a pair of tubular shafts arranged substantially in parallel with each other, and a plurality of semicircular carrier blades such that the carrier blades form a part of an imaginary spiral plane about the tubular shaft on an outer surface of the tubular shaft, the carrier blade being partially made of a material having a resistance to abrasion.

5 Claims, 11 Drawing Sheets

(51) Int. Cl.
  *B65G 33/18* (2006.01)
  *B65G 33/30* (2006.01)
  *C02F 11/12* (2006.01)
  *F26B 23/00* (2006.01)

(52) U.S. Cl.
  CPC .............. *F26B 17/20* (2013.01); *F26B 23/00* (2013.01); *F26B 2200/04* (2013.01); *F26B 2200/24* (2013.01)

(58) Field of Classification Search
  USPC ............................................................ 34/60
  See application file for complete search history.

(56) References Cited

U.S. PATENT DOCUMENTS

| | | | | | |
|---|---|---|---|---|---|
| 3,392,455 | A | * | 7/1968 | Kingsbaker, Jr. | A23J 1/006 159/17.3 |
| 4,237,618 | A | * | 12/1980 | Maffet | B30B 9/121 100/117 |
| 4,761,897 | A | | 8/1988 | Tazaki et al. | |
| 5,321,900 | A | * | 6/1994 | Meyer | F26B 17/205 34/129 |
| 5,586,396 | A | * | 12/1996 | Kanai | F26B 11/14 34/182 |
| 5,628,126 | A | * | 5/1997 | North | F26B 3/205 34/135 |
| 5,946,815 | A | * | 9/1999 | Wetzel | A47J 37/044 34/136 |
| 6,079,118 | A | * | 6/2000 | Kiyokawa | F26B 17/20 34/134 |
| 7,044,289 | B2 | * | 5/2006 | Madsen | A22C 11/08 198/663 |
| 7,255,223 | B2 | * | 8/2007 | Schaer | B01F 7/00391 198/493 |
| 8,985,313 | B2 | * | 3/2015 | Moriyama | B65G 33/18 198/662 |
| 9,441,882 | B2 | * | 9/2016 | Yoshikawa | B65G 65/4836 |
| 2008/0184587 | A1 | | 8/2008 | Shivvers | |
| 2014/0190792 | A1 | * | 7/2014 | Moriyama | B65G 33/18 198/663 |

FOREIGN PATENT DOCUMENTS

| | | | | |
|---|---|---|---|---|
| JP | H05-223454 | A | | 8/1993 |
| JP | 2002-219443 | A | | 8/2002 |
| JP | 2003-287371 | A | | 10/2003 |
| JP | 2004-073917 | A | | 3/2004 |
| JP | 2004-351346 | A | | 12/2004 |
| JP | 2007-136328 | A | | 6/2007 |
| JP | 2008-082630 | A | | 4/2008 |
| JP | 2011-137613 | A | | 7/2011 |
| JP | 2011137613 | A | * | 7/2011 |
| JP | 2014-133601 | A | | 7/2014 |
| JP | 2014-184992 | A | | 10/2014 |
| JP | 2017003146 | A | * | 1/2017 ............. F26B 1/005 |
| KR | 10-2006-0106800 | A | | 10/2006 |
| KR | 10-2013-0055786 | A | | 5/2013 |
| WO | 2015/039174 | A1 | | 3/2015 |

OTHER PUBLICATIONS

Written Opinion of International Searching Authority issued in PCT/JP2016/064452, dated Aug. 9, 2016 (4 pages).
International Search Report issued in PCT/JP2016/064452, dated Aug. 9, 2016, with English translation (5 pages).
Office Action dated Sep. 21, 2016, issued in Korean Patent Application No. 10-2015-0117978, with English translation (10 pages).
Office Action dated Mar. 27, 2017, issued in Korean Patent Application No. 10-2015-0117978, with English translation (10 pages).
Extended European Search Report dated May 24, 2017, issued in European Patent Application No. EP16790252 (7 pages).

* cited by examiner

DRIER APPARATUS

CROSS-REFERENCE TO RELATED APPLICATIONS

This application is a continuation application of International Patent Application No. PCT/JP2016/064452 filed on May 16, 2016, which claims priority to Japanese Patent Application No. 2015-114998 filed on Jun. 5, 2015 in Japan, the entire contents of which are incorporated by reference herein.

FIELD OF THE INVENTION

The present invention relates to a drier apparatus for drying sludge, food wastes, wood chips, and so on by virtue of high-temperature steam acting as a heat source.

BACKGROUND ART

Various systems have been conventionally developed with respect to an apparatus for drying sludge and food wastes, and a carrier system to be equipped in the apparatus. As such systems having relevancy with the present invention, there can be found "a drier apparatus" disclosed in the patent document 1, and "screw conveyer" disclosed in the patent document 2.

The drier apparatus disclosed in the patent document 1 includes a cylindrical chamber in which a pair of screw conveyers each including a tubular shaft, and carrier blades arranged on an outer surface of the tubular shaft is housed, a motor for rotating the screw conveyers, and rotary joints rotatably supporting the tubular shaft at its opposite ends in order to allow steam, that is, heat medium having been heated in advance, to flow in the tubular shaft. The drier apparatus disclosed in the patent document 1 has advantages that no exhaust gas and soot are generated while the drier apparatus is in operation, and that the drier apparatus can be readily handled and maintained.

The screw conveyer disclosed in the patent document 2 includes rotary carriers arranged in parallel with each other, each rotary carriers including two tubular shafts arranged in a common imaginary plane such that the tubular shafts are rotatable by a motor, and a plurality of semicircular carrier blades fixed on an outer surface of the tubular shafts such that the carrier blades form a part of an imaginary spiral plane about an axis of each of the tubular shafts. A drier apparatus equipped with the screw conveyer disclosed in the patent document 2 has an advantage that a material to be carried (a material to be dried) is difficult to be adhered to the tubular shafts, and to be clogged in the tubular shafts.

PRIOR ART DOCUMENTS

Patent Documents

Patent document 1: Japanese Patent Application Publication No. 2011-137613
Patent document 2: Japanese Patent Application Publication No. 2014-133601

DISCLOSURE OF THE INVENTION

Problems to be Solved by the Invention

The drier apparatus disclosed in the patent document 1 is accompanied with a problem that if outside air flows into the cylindrical chamber through openings through which a material to be dried is thrown into and exhausted out of the cylindrical chamber, a target material cannot be well dried, and an energy efficiency is deteriorated. The screw conveyer disclosed in the patent document 2 is accompanied with a problem that the carrier blades are rapidly worn out, and/or the durability of the carrier blades is deteriorated in dependence on kinds and/or physical property of a material to be carried (a material to be dried).

In view of the above-mentioned problems in the prior art, it is an object of the present invention to provide a drier apparatus capable of effectively and stably drying a material to be dried, and enhancing durability of carried blades.

Solution to the Problems

The present invention provides a drier apparatus including a cylindrical chamber in which a plurality of screw conveyers each including a tubular shaft in which heat medium is able to flow, and carrier blades arranged on an outer surface of the tubular shaft is housed, a driver for rotating the screw conveyers, an input path connected to the cylindrical chamber at a proximal end of each of the screw conveyers, and an output path connected to the cylindrical chamber at a distal end of each of the screw conveyers, at least one of the input path and the output path including means for opening and closing a path, each of the screw conveyers including: at least one pair of tubular shafts arranged substantially in parallel with each other, and a plurality of semicircular carrier blades such that the carrier blades form a part of an imaginary spiral plane about the tubular shaft on an outer surface of the tubular shaft, the carrier blades being partially made of a material having a resistance to abrasion.

In the above-mentioned drier apparatus, a material to be dried thrown into the screw conveyers at proximal ends is heated by heat medium supplied into the tubular shafts, and is stirred by means of the carrier blades while the screw conveyers are in rotation, being fed towards distal ends of the screw conveyers. A material to be dried is heated by making contact with the heated carrier blades and/or the heated tubular shafts while being fed, and accordingly, dried. Thus, it is possible to effectively dry a material to be dried by controlling a temperature of the heat medium, and further by appropriately setting a temperature and/or a carriage speed of the screw conveyers in dependence on kinds, physical properties and/or a moisture content of a material to be dried.

Furthermore, the means for opening and closing a path, equipped in at least one of the input path and the output path, is able to keep the input path and the output path closed to thereby prevent outside air from flowing into the cylindrical chamber, ensuring is possible to effectively and stably dry a material to be dried.

In addition, since the carrier blade is partially made of a material having a resistance to abrasion, it is possible to reduce the abrasion of carrier blades, providing high durability to carrier blades. A material having a resistance to abrasion may be detachably attached to a part of a carrier blade, in which case, even if the material is worn out, it is possible to restore the function of carriage by exchanging only the worn-out material to a new one, ensuring enhancement in durability of the carrier blades.

It is preferable for the screw conveyers comprising a part of the drier apparatus in accordance with the present invention to be arranged in such a manner that a distance between outer surfaces of the tubular shafts situated adjacent to each other is greater than a length by which the carrier blades project from outer surfaces of the tubular shafts, but smaller than the doubled length.

It is preferable that the means for opening and closing a path includes a door rotatable around a support shaft extending in a direction intersecting with a gravity direction, means for causing the door to keep closing a path, and means for opening the door when a mass of a material to be dried lying on the door is over a predetermined mass.

The cylindrical chamber may be designed to include heater means, in which case, the heater means may be designed to comprise heater and fan means for heating air taken out of a certain region in the cylindrical chamber and feeding the thus heated air into other region in the cylindrical chamber.

The drier apparatus may be designed to further include means for exhausting steam generated in the cylindrical chamber.

A pre-processing machine having a function of cutting into pieces and heating a material to be dried and to be thrown into the input path may be equipped in the input path.

Advantages Provided by the Invention

The present invention provides the drier apparatus capable of effectively and stably drying a material to be dried, and enhancing durability of carried blades.

EMBODIMENT FOR REDUCING THE INVENTION TO PRACTICE

The drier apparatus 10 in accordance with the embodiment of the present invention is explained hereinbelow with reference to the drawings.

Figure 1:
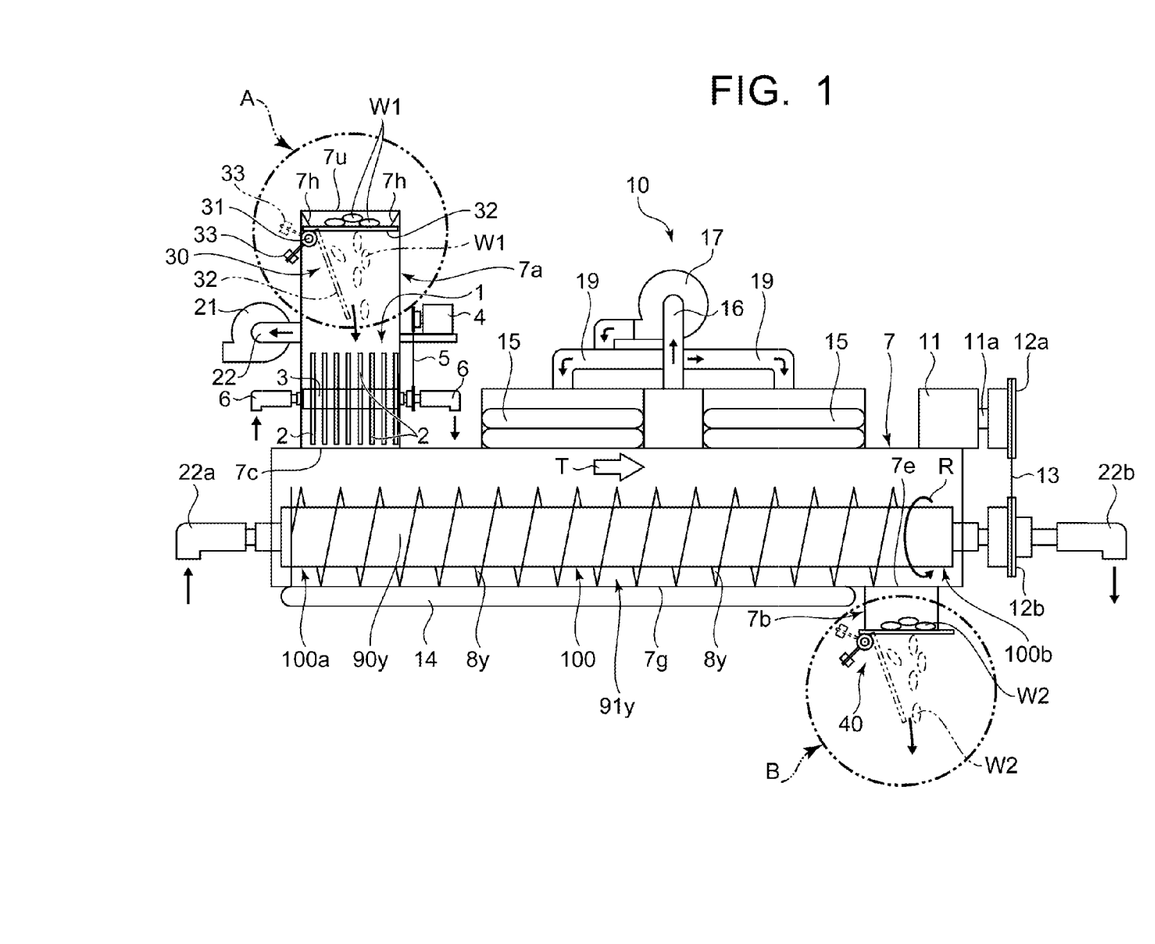
FIG. 1 illustrates a structure of the drier apparatus in accordance with the embodiment of the present invention.

The embodiment of the present invention is explained hereinbelow with reference to the drawings. As illustrated in FIG. 1, the drier apparatus 10 includes a cylindrical chamber 7 in which a screw conveyer 100 is housed, a motor 11 acting as a driver for rotating two tubular shafts 90x and 90y defining the screw conveyer 100, rotary joints 22a and 22b rotatably supporting the tubular shafts 90x and 90y at opposite ends in order to allow heated steam as heat medium having been heated in advance to flow into the tubular shafts 90x and 90y. A chain 13 is tensioned between a sprocket wheel 12a connected to a drive shaft 11a of the motor 11 and a sprocket wheel 12b connected to ends 9a of the tubular shafts 90x and 90y.

The cylindrical chamber 7 is formed at a ceiling thereof with a cylindrical input path 7a at a proximal end 100a of the screw conveyer 100, and is further formed at a bottom thereof with a cylindrical output path 7b at a distal end 100b of the screw conveyer 100. In the input path 7a is located a path opener/closer 30, and in the output path 7b is located a path opener/closer 40.

Figure 2:
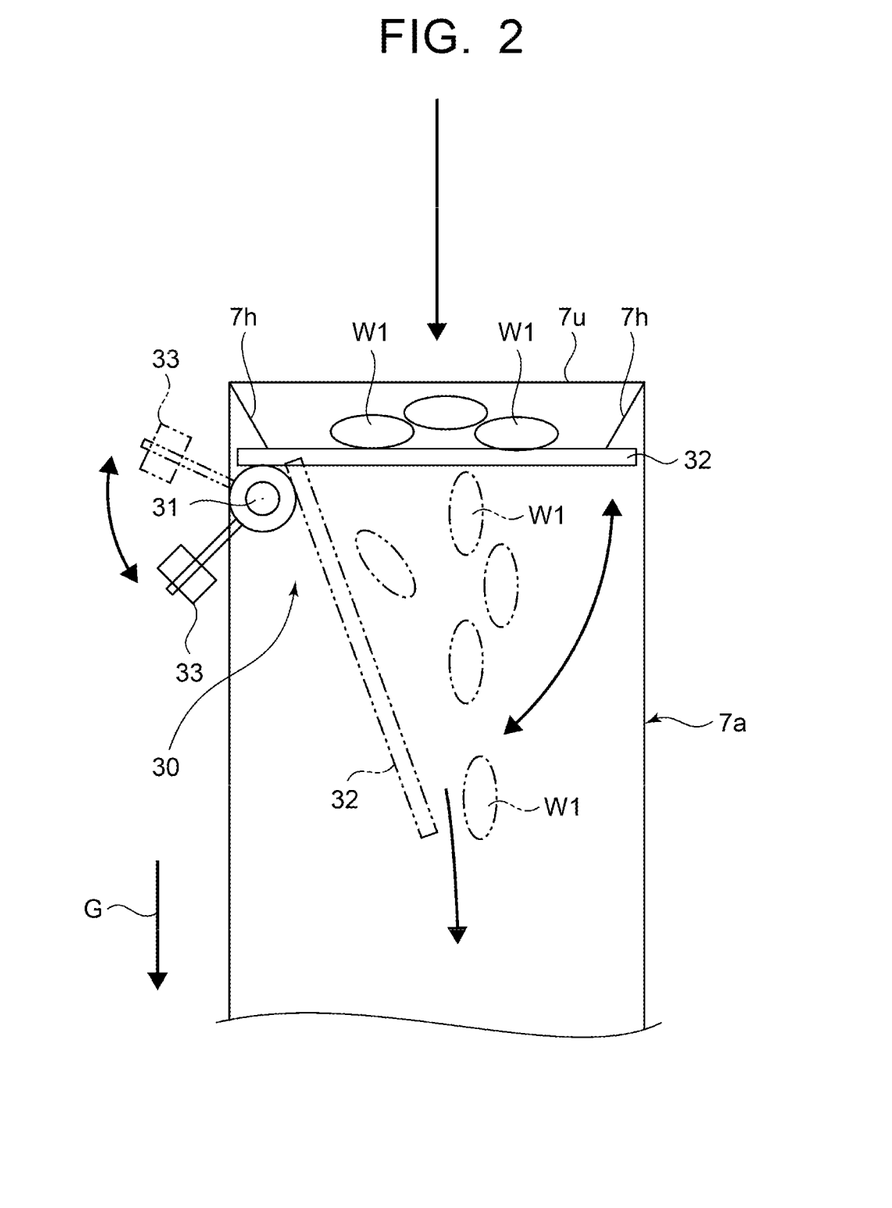
FIG. 2 is an enlarged view indicated with an arrow A shown in FIG. 1.

As illustrated in FIG. 2, the path opener/closer 30 is arranged below a hopper 7h arranged at an upper opening 7u of the input path 7a. The path opener/closer 30 includes a door 32 arranged in the input path 7a so as to be rotatable around a support shaft 31 extending in a direction intersecting with a gravity direction (a direction indicated with an arrow G), and a weight 33 acting as means for causing the door 32 to keep closing a path.

Both of the door 32 and the weight 33 are able to rotate like a seesaw around the support shaft 31. In a usual condition (a condition in which a material to be dried, that is, a non-dry material W1 is not thrown into the input path), the door 32 makes close contact at an upper surface thereof with a lower surface of the hopper 7h to thereby be kept horizontal by virtue of gravitational force acting on the weight 33. Thus, the input path 7a is kept closed.

The non-dry materials W1 thrown into the input path 7a pile up onto the door 32 kept horizontal. When a mass of the non-dry materials W1 piling up onto the door 32 exceeds a designed mass calculated based on the weight 33, the door 32 downwardly rotates around the support shaft 31, and thus, the input path 7a is open, resulting in that the non-dry materials W1 piling up on the door 32 fall down into the input path 7a from the door 32.

When a mass of the non-dry materials W1 on the door 32 other than the non-dry materials W1 having fallen down into the input path 7a is below the above-mentioned designed mass, the door 32 upwardly rotates around the support shaft 31 by virtue of the gravitational force acting on the weight 33 to thereby return to a horizontal posture, resulting in that the input path 7a is closed by the door 32.

As mentioned above, the door 32 repeats rotation around the support shaft 31 in accordance with increase or decrease of the non-dry material W1 thrown into the hopper 7h and piling up onto the door 32, and thus, the input path 7a repeats being kept open and closed.

As illustrated in FIG. 1, the input path 7a is connected at a bottom thereof to an upper opening 7c of the cylindrical chamber 7, and a pre-processing machine 1 is equipped in the input path 7a just above the upper opening 7c. An intake manifold 22 of a fan 21 makes gas-communication with the input path 7a between the hopper 7h and the pre-processing machine 1.

The pre-processing machine 1 includes a pair of tubular shafts 3 housed in the input path 7a substantially in parallel with each other, a plurality of circular discs 2 arranged on and coaxially with the tubular shafts 3, a motor 4 to drive or rotate the tubular shafts 3, and rotary joints 6 rotatably supporting the tubular shafts 3 at their opposite ends in order to allow steam, that is, heat medium having been heated in advance to flow in the tubular shafts 3.

Each of the circular discs 2 extending around the tubular shafts 3 is formed with substantially V-shaped cut-outs (not illustrated) by every 90 degrees around the tubular shafts 3. The motor 4 drives or rotates a pair of the tubular shafts 3 through two chains 5. A distance between the tubular shafts 3 is designed to be smaller than an outer diameter of the circular discs 2. As mentioned later, the pre-processing machine 1 has a function of cutting into pieces and heating the non-dry material W1 thrown into the hopper 7h and falling down from the door 32, by means of the rotating circular discs 2.

Figure 3:
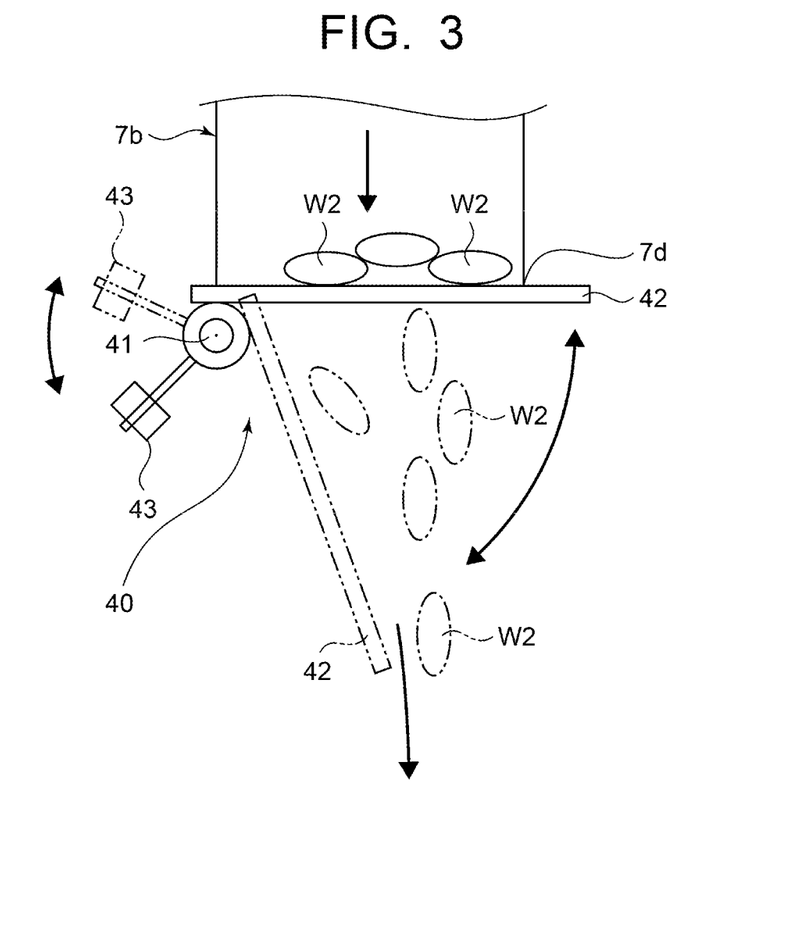
FIG. 3 is an enlarged view indicated with an arrow B shown in FIG. 1.

As illustrated in FIG. 3, the path opener/closer 40 is arranged at a lower opening 7d of the output path 7b. The path opener/closer 40 includes a door 42 arranged below the lower opening 7d so as to be rotatable around a support shaft 41 extending in a direction intersecting with a gravity direction (a direction indicated with the arrow G), and a weight 43 acting as means for causing the door 42 to keep closing a path.

Both of the door 42 and the weight 43 are able to rotate like a seesaw around the support shaft 41. In a usual condition (a condition in which a dried material W2 exhausted through a lower opening 7e (see FIG. 1) of the cylindrical chamber 7 does not pile up on the door 42), the door 42 makes close contact at an upper surface thereof with the lower opening 7d of the output path 7b to thereby be kept horizontal by virtue of gravitational force acting on the weight 43. Thus, the output path 7b is kept closed.

The dried material W2 exhausted through the lower opening 7e of the cylindrical chamber 7 piles up onto the door 42 kept horizontal. When a mass of the dried materials W2 piling up onto the door 42 exceeds a designed mass calculated based on the weight 43, the door 42 downwardly rotates around the support shaft 41, and thus, the output path 7b is open, resulting in that the dried materials W2 piling up on the door 42 fall down into the output path 7b from the door 42. The dried materials W2 exhausted through the output path 7b is gathered in a predetermined container or in a predetermined site.

When a mass of the dried materials W1 on the door 42 other than the dried materials W2 having fallen down from the door 42 is below the above-mentioned designed mass, the door 42 upwardly rotates around the support shaft 41 by virtue of the gravitational force acting on the weight 43 to thereby return to a horizontal posture, resulting in that the lower opening 7d of the output path 7b is closed by the door 42.

As mentioned above, the door 42 repeats rotation around the support shaft 41 in accordance with increase or decrease of the dried material W2 exhausted through the lower opening 7e of the cylindrical chamber 7 and piling up onto the door 42, and thus, the output path 7b repeats being kept open and closed.

Figure 4:
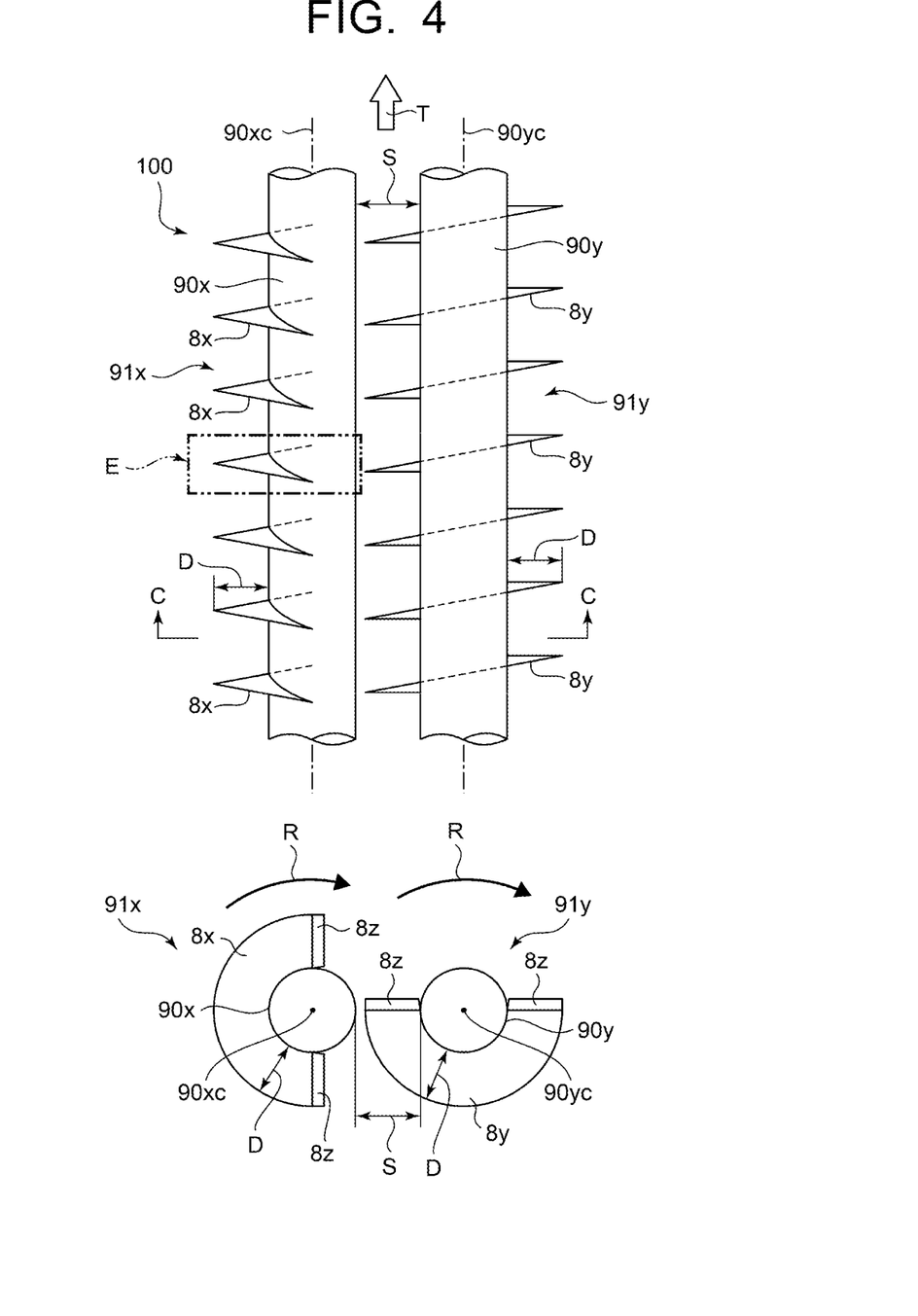
FIG. 4 illustrates a structure of the screw conveyers comprising a part of the drier apparatus illustrated in FIG. 1.

As illustrated in FIGS. 1 and 4, the screw conveyer 100 includes rotary carriers 91x and 91y housed in the cylindrical chamber 7 in parallel with each other. Each of the rotary carriers 91x and 91y includes a tubular shaft 90x or 90y arranged rotatable by the motor 11, and a plurality of semicircular carrier blades 8x or 8y arranged on an outer surface of each of the tubular shafts 90x and 90y such that the carrier blades 8x and 8y form a part of an imaginary spiral plane about each of the tubular shafts 90x and 90y (an axis 90xc and 90yc). A distance S between the outer surfaces of the tubular shafts 90x and 90y situated adjacent to each other is greater than a length D by which the carrier blades 8x and 8 project from the outer surfaces of the tubular shafts 90x and 90y, but smaller than the doubled length 2D.

A plurality of the carrier blades 8x and 8y defining a part of the rotary carriers 91x and 91y is fixed on the tubular shafts 90x and 90y such that the carrier blades 8x and 8y define a part of a left-screw imaginary spiral plane around the tubular shafts 90x and 90y (the axes 90xc and 90yc), and is aligned along the axes 90xc and 90yc of the tubular shafts 90x and 90y. The rotary carriers 91x and 91y are identical in a shape and a size with each other, and the tubular shafts 90x and 90y of the rotary carriers 91x and 91y are arranged in parallel with each other. The carrier blades 8x fixed on the outer surface of the tubular shaft 90x and the carrier blades 8y fixed on the outer surface of the tubular shaft 90y are aligned at common locations in a direction of the axes 90xc and 90yc.

Figure 5:
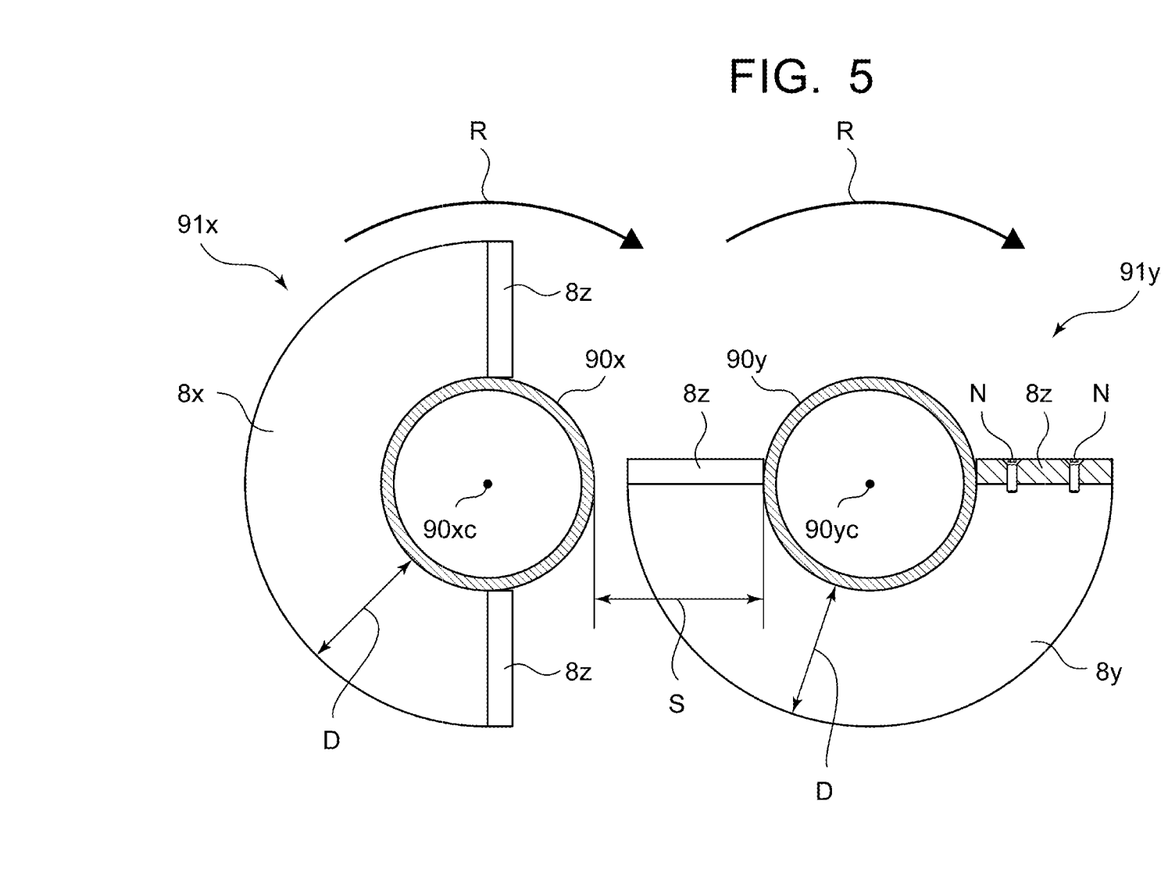
FIG. 5 is a cross-sectional view taken along the line C-C shown in FIG. 4.
Figure 6:
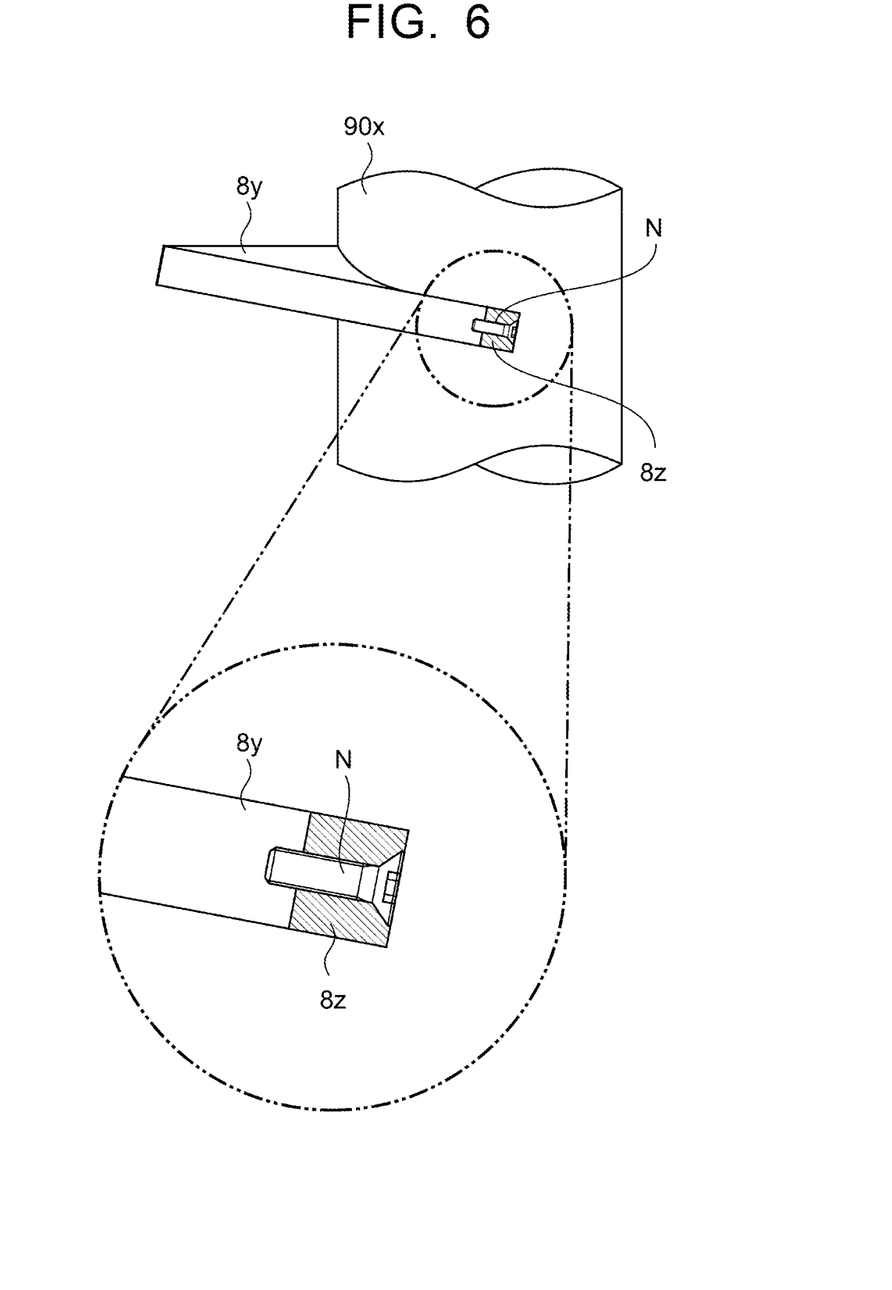
FIG. 6 is an enlarged view, though partially omitted, indicated with an arrow E shown in FIG. 4.

As illustrated in FIGS. 5 and 6, a material 8z having a resistance to abrasion is attached as a reinforcement to a radius portion of the semicircular shape in the carrier blades 8x and 8y. The material 8z having a resistance to abrasion is detachably attached to the carrier blade 8x and 8y by means of a plurality of screws N. The material 8z having a resistance to abrasion is designed to have a thickness equal to a thickness of the carrier blade 8x and 8y, and is in the form of a quadratic prism having a length equal to the length D of the carrier blades 8x and 8y. A material of which the material 8z is made is not limited to specific materials, but is preferable to be a steel harder than the carrier blades 8x and 8y, hard metal alloy or ceramics.

Means for attaching the material 8z to the carrier blades 8x and 8y is not to be limited to the screws N. The material 8z may be attached to the carrier blades 8x and 8y by means of a combination of a concave and a convex to be fit into the concave, or by welding. As an alternative, the material 8z may be attached to the carried blades 8x and 8y by build-up welding. The material 8z may be attached to any portions having probability to be worn out, for instance, arcuate portions of the carrier blades 8x and 8y, or opposite surfaces of the carrier blades 8x and 8y.

As illustrated in FIG. 4, the tubular shafts 90x and 90y each defining the rotary carriers 91x and 91y are designed to rotate in a common direction (a direction indicated with an arrow R shown in FIG. 4) to thereby feed a target (not illustrated) in a direction defined by the axes 90xc and 90yc of the tubular shafts 90x and 90y (a direction indicated with an arrow T shown in FIGS. 1 and 4). A number of rotations of the rotary shafts 91x and 91y (the tubular shafts 90x and 90y) can be set in dependence on kinds and/or physical properties of a target to be fed. In the current embodiment, the rotary carrier 91x (the tubular shaft 90x) is designed to rotate at 4 rpm, and the rotary carrier 91y (the tubular shaft 90y) is designed to rotate at 2 rpm.

Though not illustrated, the cylindrical chamber 7 has a bottom 7g which is in the form of a substantially U-shaped groove. A heating tube 14 acting as a heater is situated in the bottom 7g. Two heat exchangers 15 are situated on the cylindrical chamber 7 in the vicinity of a center of the cylindrical chamber 7. The heat exchangers 15 are spaced away from each other by a predetermined distance in a direction in which a target material is fed by means of the screw conveyer 100. The heating tube 14 and the heat exchangers 15 are designed to heat a target by virtue of heated steam supplied from outside.

On the cylindrical chamber 7 in the vicinity of a center of the screw conveyer 100 are situated a duct 16 making gas-communication with an inner central area of the cylindrical chamber 7, and a fan 17 feeding a gas having been sucked from the cylindrical chamber 7 through the duct 16 again into the inner central area of the cylindrical chamber 7 through a duct 19 and the heat exchangers 15. The heat exchangers 15 are designed to be located between the duct 19 and the cylindrical chamber 7. The gas having been sucked from the cylindrical chamber 7 through the duct 16 is gradually heated by passing through the heat exchangers 15, and then, is fed again into the cylindrical chamber 7. Thus, the gas existing in the cylindrical chamber 7 is used for drying a material to be dried, while the gas is circulating in the duct 16, the heat exchangers 15, and the duct 19.

Hereinbelow is explained a case where the drier apparatus 10 is used to dry sludge (the non-dry material W1). By starting the motors 4 and 11, tubular shaft 3 of the pre-processing machine 1 and the screw conveyer 100 start being rotated, and further, heated steam supplied from a steam boiler (not illustrated) is fed into the rotary joint 6 of the tubular shaft 3 in the pre-processing machine 1 and the rotary joint 22a connected to the proximal end 100a of the screw conveyer 100.

The heated steam having been supplied to one of the rotary joints 6 of the tubular shaft 3 in the pre-processing machine 1 and the rotary joint 22a of the screw conveyer 100 passes through the tubular shafts 3, 90x and 90y, is exhausted through the other rotary joints 6 and 22b, and then, is fed to a predetermined collector device. The tubular shaft 3, the discs 2 and the rotary carriers 91x and 91y are wholly heated up to a predetermined temperature by virtue of heat conduction from the tubular shafts 3, 90x and 90y having been heated by the heated steam. When the discs 2 and the rotary carriers 91x and 91y are heated up to a predetermined temperature, the fans 17 and 21 start being operated to thereby start circulate and exhaust the gas existing in the cylindrical chamber 7.

Thereafter, a material to be dried, sludge (the non-dry material W1), is thrown into the hopper 7h through the upper opening 7u of the input path 7a. When a mass of the non-dry material W1 piling up onto the door 32 is over a predetermined value, the door 32 downwardly rotates, and accordingly, the non-dry material W1 falls down to the pre-processing machine 1. The non-dry material W1 having fallen to the pre-processing machine 1 is heated and cut into pieces by means of the discs 2 each formed with a cut-out, while passing through gaps formed between the heated and rotating discs 2. Then, the non-dry material W1 passes through the upper opening 7c of the cylindrical chamber 7 located below the input path 7a, and is thrown at the proximal end 100a into the screw conveyer 100 housed in the cylindrical chamber 7.

The non-dry material W1 thrown into the screw conveyer 100 at the proximal end 100a is fed towards the distal end 100b, being stirred by the carrier blades 8x and 8y of the heated and rotating rotary carriers 91x and 91y. While being fed, the non-dry material W1 is heated and accordingly dried by making contact with the heated carrier blades 8x and 8y and the heated tubular shafts 90x and 90y. Thus, the non-dry material W1 is finally turned into the dried material W2, and is exhausted through the lower opening 7e situated in the vicinity of the distal end 100b of the screw conveyer 100, and the output path 7b.

In the drier apparatus 10, the rotary carriers 91x and 91y defining the screw conveyer 100 are designed to rotate at 4 rpm and 2 rpm, respectively, and thus, a positional relation between the carrier blades 8x of the rotary carrier 91x and the carrier blades 8y of the rotary carrier 91y varies with the lapse of time in such a way as illustrated in FIGS. 7 to 11. That is, the positional relation between the carrier blades 8x of the rotary carrier 91x and the carrier blades 8y of the rotary carrier 91y successively varies in turns illustrated in FIGS. 7 to 11, and then, returns to the positional relation illustrated in FIG. 7. Thereafter, while the positional relations illustrated in FIGS. 7 to 11 are repeated, the non-dry material W1 is fed and dried.

Figure 7:
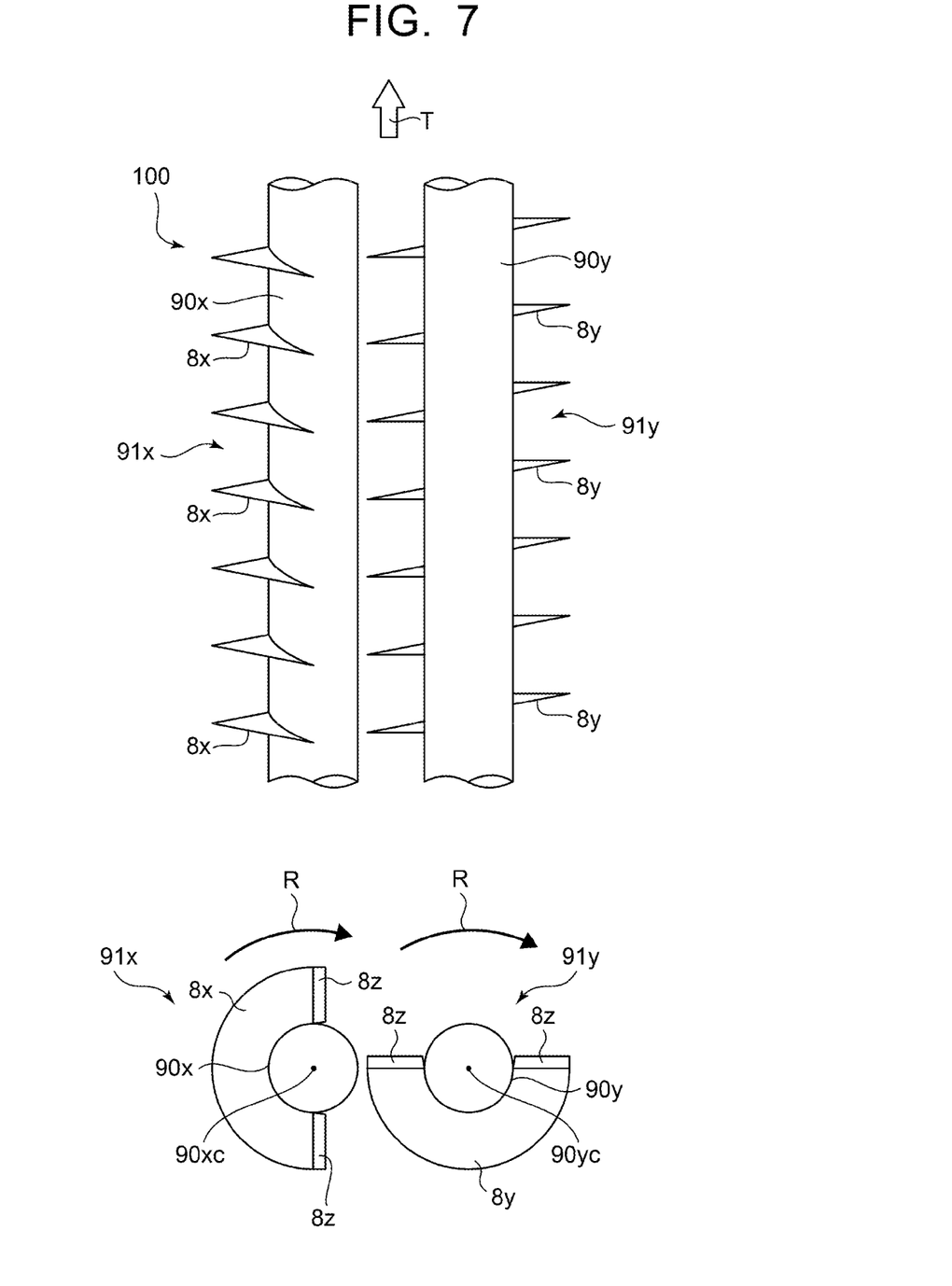
FIG. 7 is a schematic view showing the step of operating the screw conveyers illustrated in FIG. 4.
Figure 8:
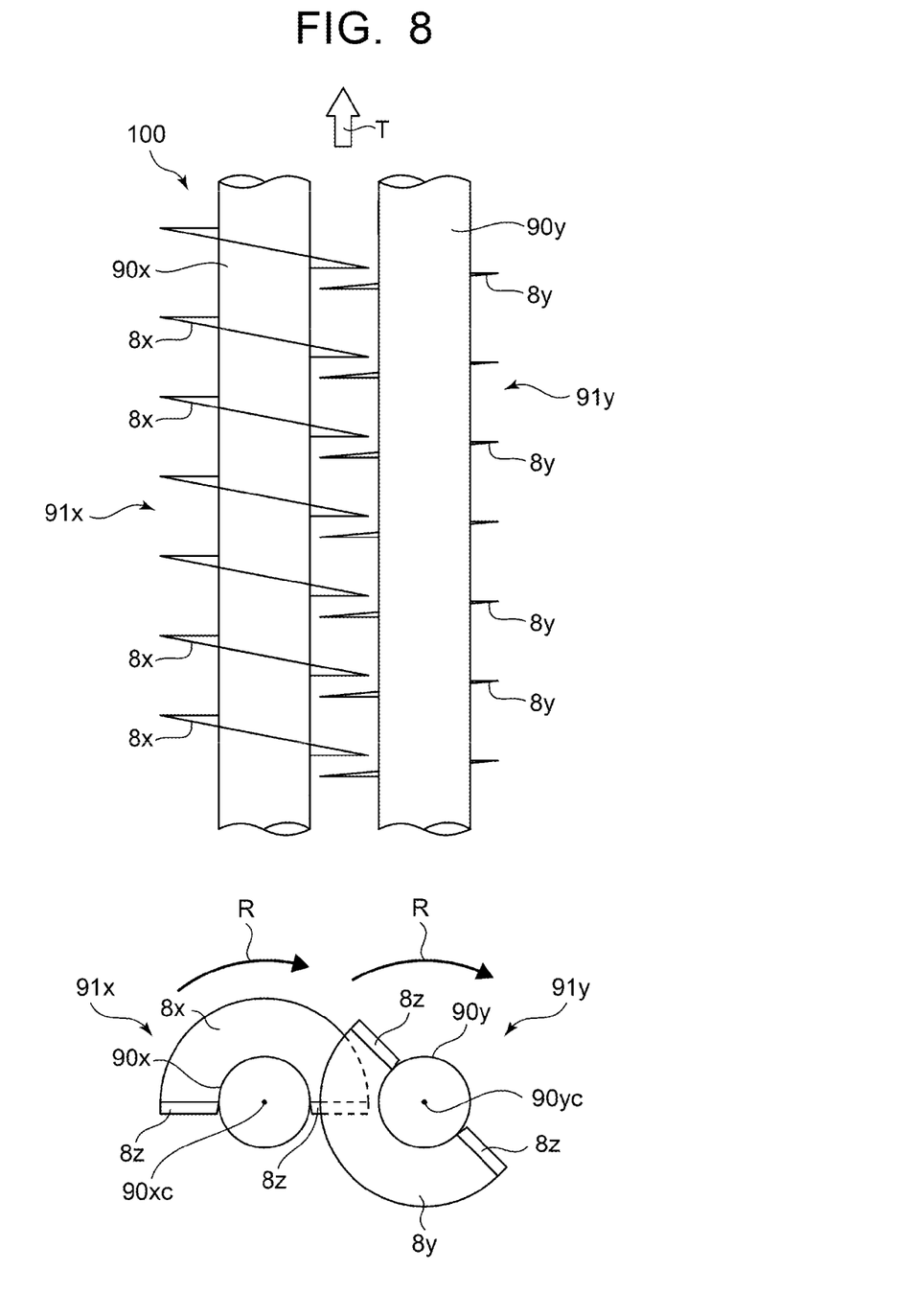
FIG. 8 is a schematic view showing the step of operating the screw conveyers illustrated in FIG. 4.
Figure 9:
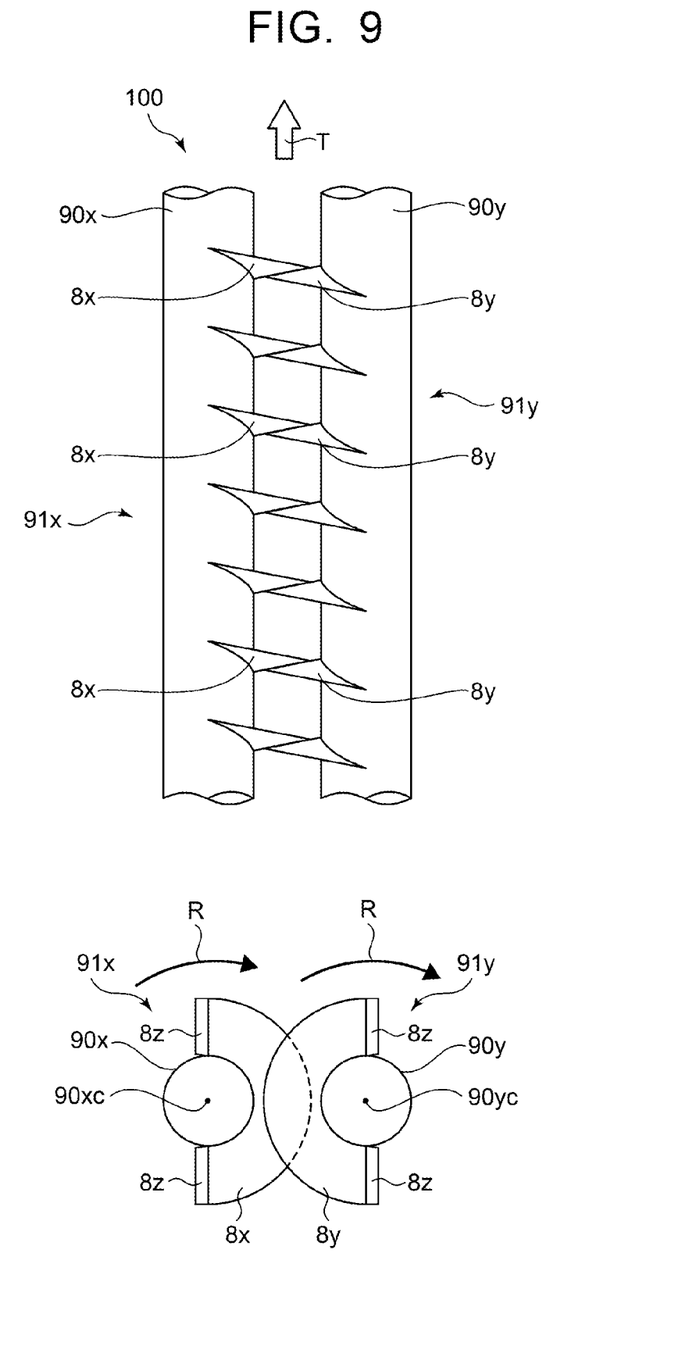
FIG. 9 is a schematic view showing the step of operating the screw conveyers illustrated in FIG. 4.
Figure 10:
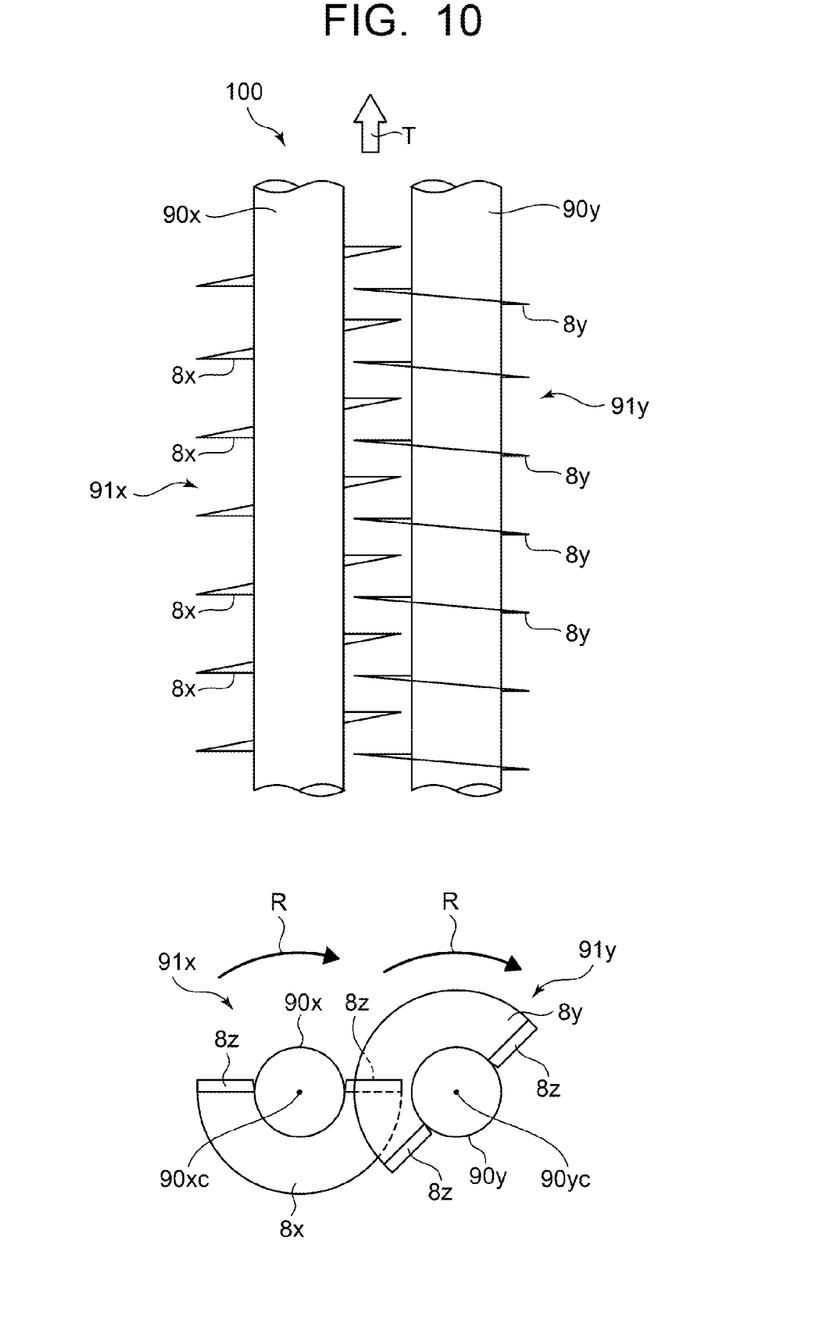
FIG. 10 is a schematic view showing the step of operating the screw conveyers illustrated in FIG. 4.
Figure 11:
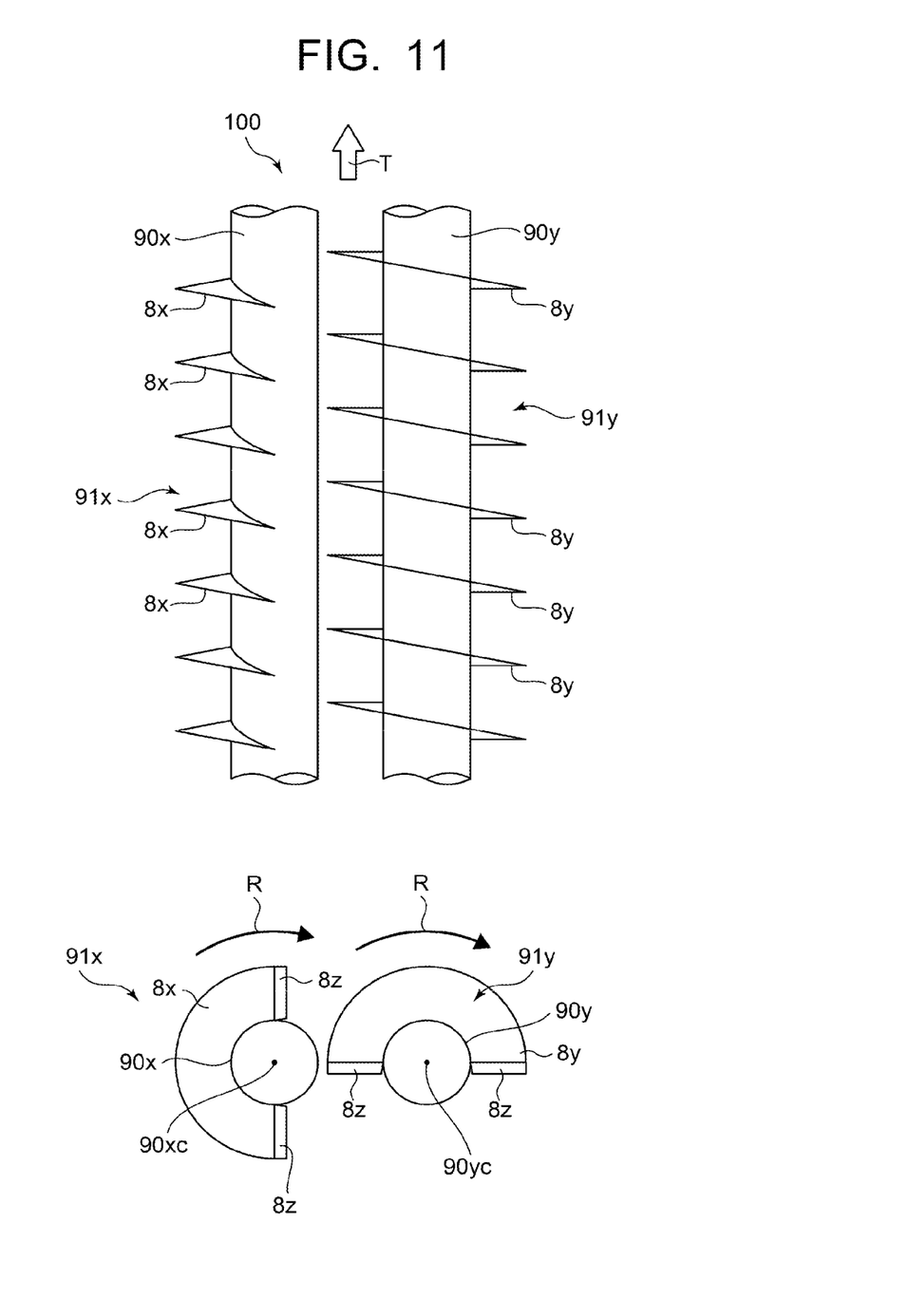
FIG. 11 is a schematic view showing the step of operating the screw conveyers illustrated in FIG. 4.

In the steps illustrated in FIGS. 7 to 11, the carrier blades 8x and 8y do not overlap each other in a direction in which the non-dry material is fed (a direction indicated with the arrow T), as illustrated in FIGS. 7 and 11, the carrier blades 8x and 8y rotate towards and away from each other, as illustrated in FIGS. 8 and 10, and the carrier blades 8x and 8y rotate towards each other and then away from each other, as illustrated in FIG. 9. Thus, it is possible to prevent the non-dry material W1 from keeping adhered to the carrier blades 8x and 8y, and further, from clogging in spaces formed between the adjacent carrier blades 8x and 8y.

Consequently, the screw conveyer 100 is able to prevent the feeding function of the carrier blades 8x and 8y from being deteriorated due to adhesion and/or clogging of the non-dry material W1, and further prevent a load acting on the motor 11 as a driver from increasing, ensuring that there is almost no necessity of interruption for cleaning the screw conveyer 100 (removing the non-dry material W1), and hence, it is possible to remarkably enhance an efficiency with which the non-dry material W1 is dried. In addition, since the carrier blades 8x and 8y are designed to be reinforced with the material 8z having a resistance to abrasion, it is possible to prevent the carrier blades 8x and 8y from being worn out due to contact with the non-dry material W1, ensuring enhancement in the durability of the carrier blades 8x and 8y.

Furthermore, it is possible to effectively dry the non-dry material W1 or other materials by controlling a temperature of steam to be supplied into the tubular shafts 3, 90x and 90y, appropriately setting a temperature of the discs 2 of the pre-processing machine 1 and the screw conveyer 100, and appropriately setting a carriage speed (a rotation speed of the rotary carriers 91x and 91y), in accordance with kinds, physical properties and/or a moisture content of a material to be dried, that is, the non-dry material W1.

As illustrated in FIG. 1, the drier apparatus 10 is designed to include the motor 11 for rotating the screw conveyer 100 housed in the cylindrical chamber 7, and a heating system including the tubular shafts 90x and 90y through which heated steam passes, and the rotary joints 22a and 22b. That is, the drier apparatus 10 is designed to have a simple structure, and accordingly, can be readily handled and maintained, and generates small noises. Furthermore, since heat medium (heated steam) having been heated in advance is used for heating the screw conveyer 100, no exhaust gas and no smoke are generated while the drier apparatus 10 is in operation.

Furthermore, as illustrated in FIG. 1, since the cylindrical chamber 7 is designed to include the heating tube 14 at a bottom thereof, the non-dry material W1 thrown into the cylindrical chamber 7 is much heated, facilitating evaporation of moisture with the result of superior function of drying.

Furthermore, the gas taken out of an area in the cylindrical chamber 7 in the vicinity of a center of the screw conveyer 100 is heated in the heat exchangers 15, and then, is fed by means of the fan 17 into an area in the cylindrical chamber 7 in the vicinity of a center of the screw conveyer 100, ensuring that a capacity for heating the cylindrical chamber 7 can be enhanced, and waste heat can be effectively recycled, with the result of enhancement in the function of drying a material, and energy saving.

In addition, the intake manifold 22 and the fan 21 act as means for exhausting steam generated in both the pre-processing machine 1 situated in the input path 7a, and the cylindrical chamber 7. Thus, it is possible to prevent steam generated from the non-dry material W1 thrown into the input path 7a and the non-dry material W1 being stirred and dried in the screw conveyer 100 from staying in the input path 7a and the cylindrical chamber 7, being effective in enhancement in the function of drying the non-dry material W1.

The pre-processing machine 1 arranged in the input path 7a cuts into pieces the non-dry materials W1 having been thrown through the hopper 7h, by means of a plurality of the heated and rotating discs 2, and heats the thus cut non-dry materials W1. Then, the non-dry materials W1 are thrown into the screw conveyer 100 at the proximal end 100a, ensuring enhancement in an efficiency with which the non-dry materials W1 are dried.

Though the present embodiment explains a case where sludge (the non-dry material W1) is dried by means of the drier apparatus 10, a material to be dried by the drier apparatus 10 employing the screw conveyers 100 is not to be limited to sludge. It is possible to effectively dry materials other than wood chips (for instance, food waste, wood pellets, bamboo chips, and so on).

The drier apparatus having been explained so far with reference to FIGS. 1 to 11 is just an example of the present invention, and thus, the scope of the drier apparatus in accordance with the present invention is not to be limited to the above-mentioned drier apparatus 10.

INDUSTRIAL APPLICABILITY

The drier apparatus in accordance with the present invention can be employed broadly in fields of various manufacturing industries as a drier for drying sludge, food waste, wood chip, and so on.

INDICATION BY REFERENCE NUMERALS

1 Pre-processing machine
2 Disc
3, 90x, 90y Tubular shaft
4, 11 Motor
5, 13 Chain
6, 22a, 22b Rotary joint
7 Cylindrical chamber
7a Input path
7b Output path
7c, 7u Upper opening
7d, 7e Lower opening
7g Bottom
7h Hopper
8x, 8z Carrier blade
8z Material having a resistance to abrasion
10 Drier apparatus
11a Drive shaft
12b, 12b Sprocket wheel
14 Heating tub
15 Heat exchanger
16, 19 Duct
17, 21 Fan
22 Intake manifold
30, 40 Path opener/closer
31, 41 Support shaft
32, 42 Door
33, 43 Weight
90xc, 90yc Axes
91x, 91y Rotary carrier
100 Screw conveyer
100a Proximal end
100b Distal end
D Protrusion length
N Screw
R, T Arrow
S Distance
W1 Non-dry material
W2 Dried material

The invention claimed is:

1. A drier apparatus including: a cylindrical chamber in which a plurality of screw conveyers each including a tubular shaft in which heat medium is able to flow, and carrier blades arranged on an outer surface of said tubular shaft is housed; a driver for rotating said screw conveyers; an input path connected to said cylindrical chamber at a proximal end of each of said screw conveyers; and an output path connected to said cylindrical chamber at a distal end of each of said screw conveyers, at least one of said input path and said output path including a path opening/closing structure for opening and closing a path, each of said screw conveyers including: at least one pair of tubular shafts arranged substantially in parallel with each other; and a plurality of semicircular carrier blades such that said carrier blades form a part of an imaginary spiral plane about said tubular shaft on an outer surface of said tubular shaft, said carrier blades being partially made of a material having a resistance to abrasion.

2. The drier apparatus as set forth in claim 1, wherein said path opening/closing structure for opening and closing a path includes a door rotatable around a support shaft extending in a direction intersecting with a gravity direction, a path closing structure for causing said door to keep closing a path, and a path opening structure for opening said door when a mass of a material to be dried lying on said door is over a predetermined mass.

3. The drier apparatus as set forth in claim 1, wherein said cylindrical chamber includes a heater.

4. The drier apparatus as set forth in claim 1, further including an exhausting structure for exhausting steam generated in said cylindrical chamber.

5. The drier apparatus as set forth in claim 1, further including a pre-processing machine arranged in said input path, said pre-processing machine having a function of cutting into pieces and heating a material to be dried and to be thrown into said input path.

* * * * *